United States Patent [19]

Nagamoto et al.

[11] 4,411,979
[45] Oct. 25, 1983

[54] DIAZO TYPE THERMOSENSITIVE RECORDING MATERIAL

[75] Inventors: Masanaka Nagamoto, Shizuoka; Yoshihiro Koseki, Numazu; Susumu Iwata, Shizuoka, all of Japan

[73] Assignee: Ricoh Company, Ltd., Tokyo, Japan

[21] Appl. No.: 337,334

[22] Filed: Jan. 6, 1982

[30] Foreign Application Priority Data

Jan. 28, 1981 [JP] Japan ................................. 56-11186

[51] Int. Cl.³ ........................... G03C 1/54; G03C 1/60
[52] U.S. Cl. ................................. 430/176; 250/316.1; 250/317.1; 346/76 PH; 346/135.1; 430/141; 430/146; 430/148; 430/151; 430/177; 430/178; 430/179; 430/183; 430/185; 430/187; 430/346; 430/181
[58] Field of Search ............... 430/151, 176, 177, 178, 430/179, 171, 346, 348, 163, 141, 146, 181, 183, 185, 187, 148; 346/76 PH, 135.1; 250/316.1, 317.1

[56] References Cited

U.S. PATENT DOCUMENTS

| | | | |
|---|---|---|---|
| 1,821,281 | 9/1931 | van der Grinten | 430/179 |
| 2,653,091 | 9/1953 | Greig | 430/151 |
| 3,202,510 | 8/1965 | Hollmann | 430/151 |
| 3,397,058 | 8/1968 | van Loon et al. | 430/187 |
| 3,420,665 | 1/1969 | Bialczak | 430/151 |
| 3,453,112 | 7/1969 | Schaeffer | 430/151 |
| 3,539,345 | 11/1970 | Welch | 430/151 |
| 3,660,581 | 5/1972 | Levy | 430/151 |
| 3,695,885 | 10/1972 | Maryama et al. | 430/151 |

FOREIGN PATENT DOCUMENTS

| | | | |
|---|---|---|---|
| 749898 | 1/1967 | Canada | 430/151 |
| 800956 | 12/1968 | Canada | 430/151 |
| 1447714 | 1/1969 | Fed. Rep. of Germany | 430/151 |
| 1447740 | 1/1969 | Fed. Rep. of Germany | 430/151 |
| 983799 | 2/1965 | United Kingdom | 430/151 |

OTHER PUBLICATIONS

Shinozaki, S. et al., SPSE Symposium–Unconventional Photographic Systems, p. 142, 1964.

*Primary Examiner*—Charles L. Bowers, Jr.
*Attorney, Agent, or Firm*—Flynn, Thiel, Boutell & Tanis

[57] ABSTRACT

A diazo type thermosensitive recording material comprising a support material and a thermosensitive recording layer formed thereon, wherein the thermosensitive recording layer comprises a diazo compound, a coupler, a thermo-fusible or thermo-softening binder agent and a thermo-fusible material. The weight ratio of the diazo compound and the thermo-fusible material is in the range of 1:2 to 1:30, and both the diazo compound and the coupler exist as separate particles in the thermosensitive recording layer.

18 Claims, No Drawings

DIAZO TYPE THERMOSENSITIVE RECORDING MATERIAL

BACKGROUND OF THE INVENTION

The present invention relates to a thermosensitive recording material; more specifically, it relates to a diazo-type thermosensitive recording material in which the images can be fixed, i.e., protected against tampering and accidental obliteration, and in which the recording material itself can be stabilized so as to prevent additional imaging thereon.

Conventionally, there are known thermosensitive materials which utilize the reaction between an organic metal salt and a reducing agent for thermosensitive coloring, or which utilize the reaction of leuco dye with an acidic material for such coloring. However, these thermosensitive recording materials are not suitable for image fixing and the recorded images cannot be made permanent. That is, with these non-fixable type thermosensitive recording materials, it is possible to record additions to the already recorded information, and, thus, recorded matter on such a thermosensitive recording material can be altered, which may lead to low reliability of the record. Therefore, such a thermosensitive recording material cannot be used for recording many kinds of items or making documents in fields where reliability is of high importance, such as for securities, merchandise coupons, entrance tickets, certificates or payment slips, etc.

Furthermore, in general, if this kind of recording material is exposed to a temperature above 70° C., the entire surface becomes darkly colored and the record cannot be read. And in the case of a thermosensitive recording material which utilizes the reaction of leuco dye with an acidic material, the recorded matter thereon disappears when exposed to organic solvents or plasticizers contained in plastic materials.

The above-mentioned shortcomings all stem from the fact that those thermosensitive recording materials are of a non-fixable type.

On the other hand, there is known a recording material which utilizes the reaction between a diazo compound and a coupler, the so-called diazo photosensitive paper. With this diazo-type photosensitive paper, it is possible to fix the record by decomposing the residual diazo compound with light irradiation thereon.

There is known another thermosensitive recording material which also utilizes the reaction of a diazo compound with a coupler. This thermosensitive recording material of the diazo-type uses a diazo compound, a coupler and a basic material in the reaction mixture. When the recording material is preserved, the coloring reaction is prevented by separating any one of the components from the others.

The following methods have been proposed for such a separation of a component.

(1) Separation of microcapsule.

(2) Separation by putting at least one of the three components (the diazo compound, the coupler or the basic substance) into a thermosensitive material having a melting point or softening point between 50° C. and 250° C.

However, a diazo-type thermosensitive recording material formed with the above-mentioned separation methods does not provide satisfactory quality for practical use. In the method (1), if capsulation is incomplete, the recording materials that can be obtained have poor preservability and poor coloring performance. In the case of the method (2), the reacting components may become exposed on the surface of the recording material during the production process, in which those components are granulated after being mixed with other components of the thermosensitive recording material, so that the preservation thereof is poor, and coloring cannot be effected by flash heating.

Recently, a thermosensitive recording material has been sought which would allow rapid recording in facsimile and telex apparatus, computers and medical analytical instruments. Especially in the field of facsimiles, a thermosensitive recording material suitable for rapid recording is required so that communication costs can be minimized.

Although a diazo-type thermosensitive recording material has the advantage of being fixable, the hitherto known materials are not satisfactory for long-term preservation and have insufficient thermal response to a thermal head.

SUMMARY OF THE INVENTION

It is therefore an object of the present invention to provide a diazo-type thermosensitive recording material comprising a diazo-type thermosensitive recording layer formed on a support material, different from the conventional diazo-type thermosensitive recording materials, with efficient thermal response to thermal heads and excellent preservation over a long period, which constitutes an easily-made monolayer recording sheet.

The diazo-type thermosensitive recording layer of the invention comprises a diazo compound, a coupler, a thermo-fusible or thermo-softening binder agent and a thermo-fusible material, wherein the weight ratio of the diazo compound to the thermo-fusible material is in the range of 1:2 to 1:30, and wherein the diazo compound and the coupler are contained as separated or unconsecutive particles.

In the present invention, since the diazo compound and the coupler are contained in the thermosensitive recording layer as unconsecutive particles, a coloring reaction does not occur during lengthy storage. Furthermore, since the thermo-fusible or thermo-softening binder agent and a thermo-fusible material are contained in the thermosensitive recording layer, the coloring reaction between the diazo compound and the coupler occurs with minimum energy usage.

DETAILED DESCRIPTION OF THE PREFERRED EMBODIMENTS

An embodiment of a diazo type thermosensitive recording material according to the present invention comprises a thermosensitive recording layer supported on a support material, which thermosensitive recording layer comprises a diazo compound, a coupler, a thermo-fusible or thermo-softening binder agent and a thermo-fusible material, wherein the weight ratio of the diazo compound to the thermo-fusible material is in the range of 1:2 to 1:30, and wherein the diazo compound and the coupler are contained in the thermosensitive recording layer as unconsecutive particles.

Diazo compounds and couplers used in the present invention are all known compounds, and examples of such compounds are given below.

Diazo Compounds:

According to the present invention, the compounds represented, for example, by the following general formulae can be used as diazo compounds:

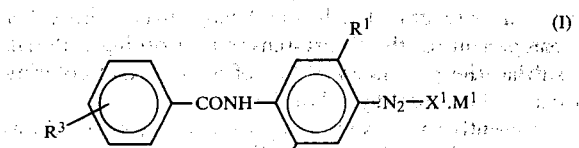  (I)

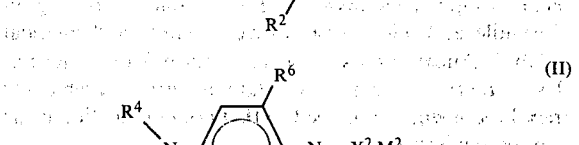  (II)

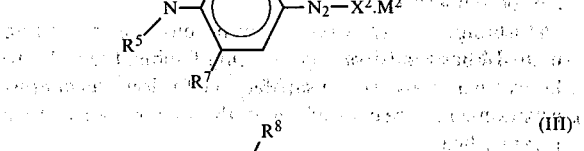  (III)

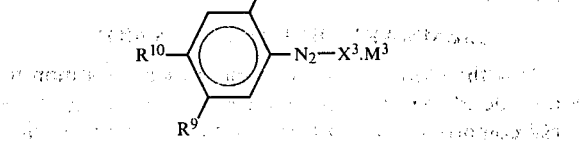  (IV)

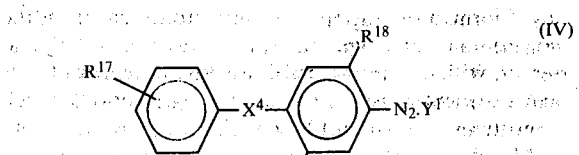  (V)

In general formulae (I), (II) and (III), $R^1$, $R^6$ and $R^8$ each represent a hydrogen atom, an alkyl group or alkoxy group having one to five carbon atoms;

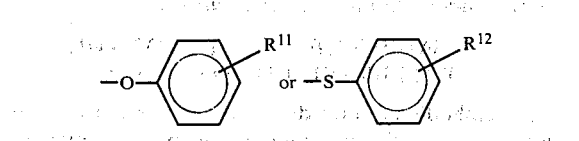

($R^{11}$ and $R^{12}$ are the same as $R^2$);

$R^2$, $R^3$ and $R^9$ each represents an alkyl or alkoxy group having one to five carbon atoms or a halogen;

$R^4$ and $R^5$ represent an alkyl group or hydroxyalkyl group with one to five carbon atoms, or

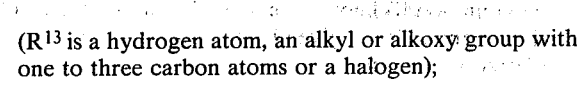

($R^{13}$ is a hydrogen atom, an alkyl or alkoxy group with one to three carbon atoms or a halogen);

$R^7$ represents a hydrogen atom, a halogen, a trifluoromethyl group, an alkyl or alkoxy group with one to five carbon atoms, or

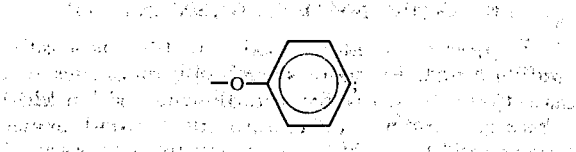

$R^{10}$ represents

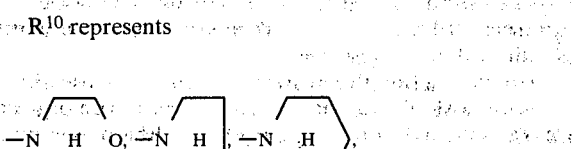

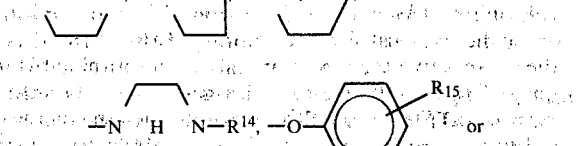

($R^{14}$, $R^{15}$ and $R^{16}$ are the same as $R^{13}$);

$X^1$, $X^2$ and $X^3$ each represent an acidic residue; and $M^1$, $M^2$ and $M^3$ each represent a metal salt such as $CdCl_2$, $ZnCl_2$ and $SnCl_2$, which form a metallic double salt. In the place of an anion X.M, a fluorine containing acidic residue such as $BF_4-$ or $PF_6-$ can be utilized for making the diazo compounds water insoluble.

In general formulae (IV) and (V):

$R^{17}$, $R^{18}$, $R^{19}$, $R^{21}$, $R^{22}$ and $R^{23}$ each represent a hydrogen atom, a lower alkyl group, a lower alkoxy group or a halogen;

$R^{20}$ represents a hydrogen atom, a lower alkyl group or a lower alkoxy group;

$X^4$ represents a sulfur atom or an oxygen atom;

$Y^1$ and $Y^2$ each represent an acidic residue, for example, a halogen ion or a fluorine-containing ion, such as $BF_4-$ and $PF_6-$; or an acidic residue forming a double salt, in combination with a metallic salt, the metallic salt, for example, being $ZnCl_2$, $CdCl_2$ or $SnCl_2$.

Specific examples of the diazo compounds represented by the general formula (I) are as follows:

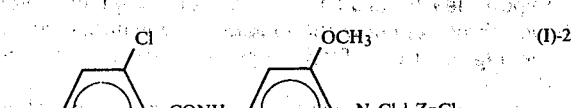  (I)-1

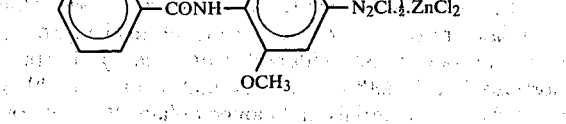  (I)-2

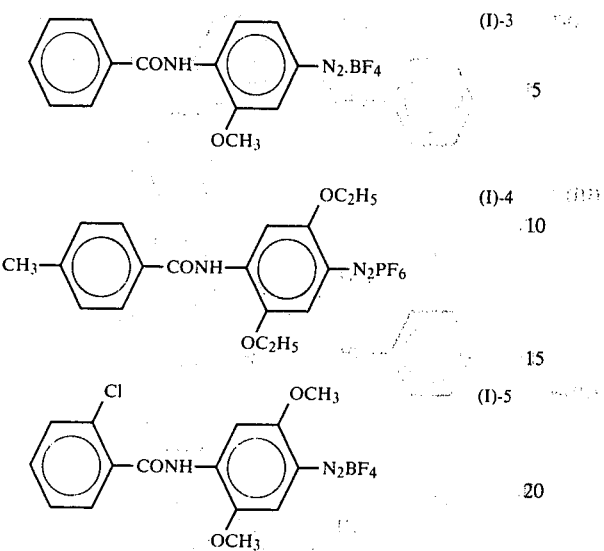
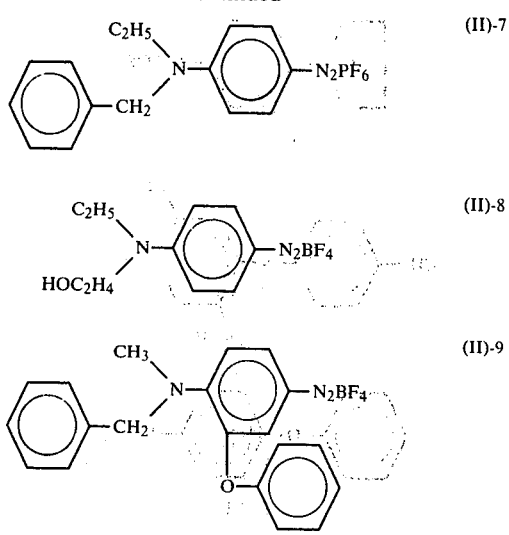
Examples of the diazo compounds represented by the general formula (II) are as follows:
Specific examples of the diazo compounds represented by the general formula (III) are as follows:
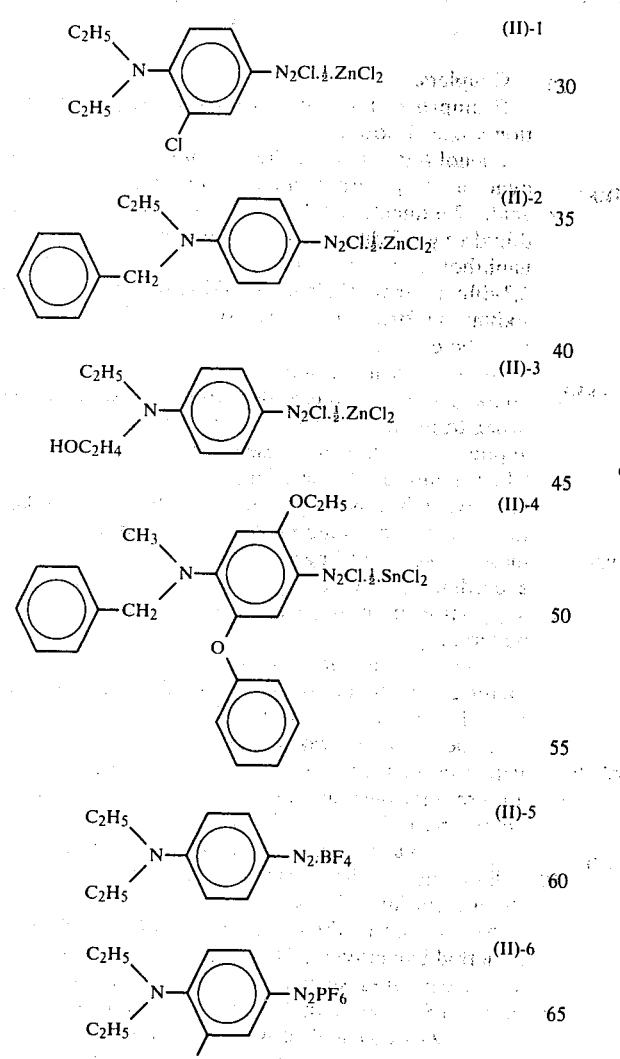
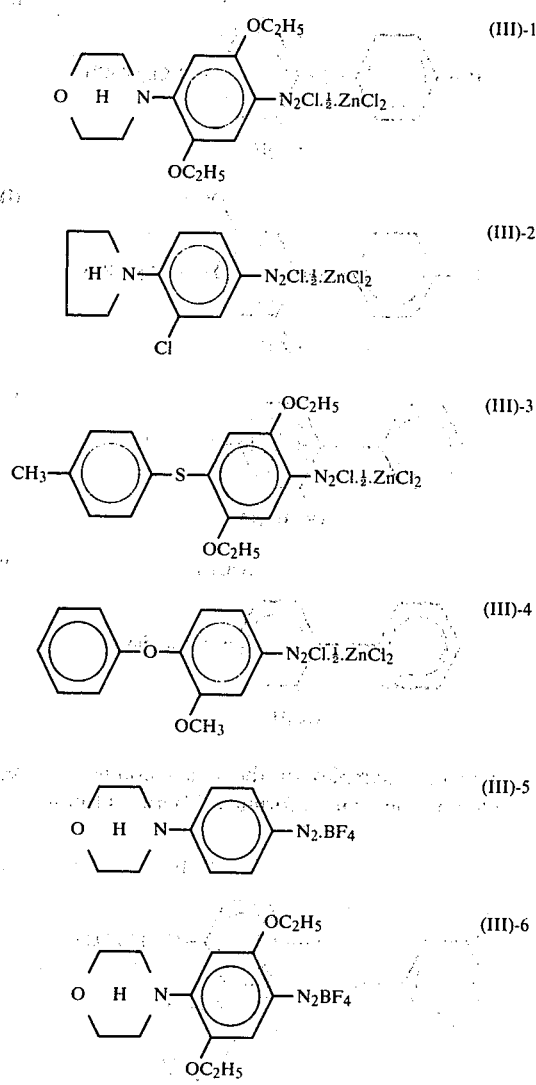

-continued

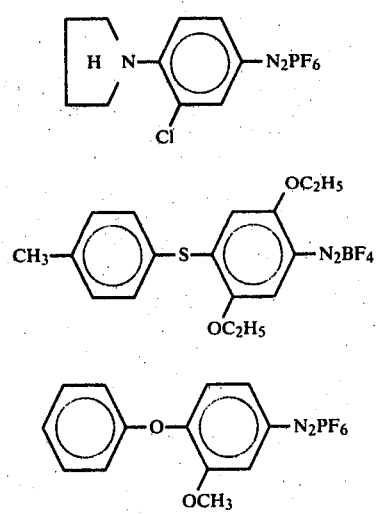

Specific examples of the diazo compounds represented by the general formula (IV) are as follows:

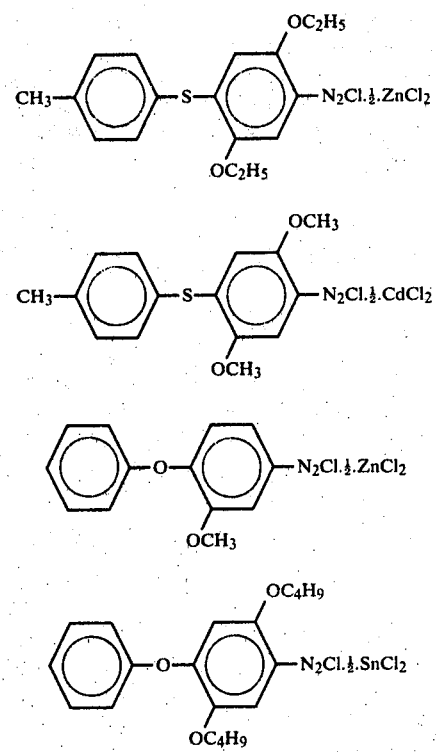

Specific examples of the diazo compounds represented by the general formula (V) are as follows:

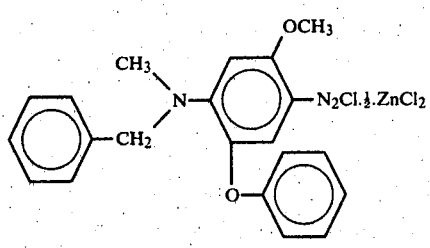

-continued

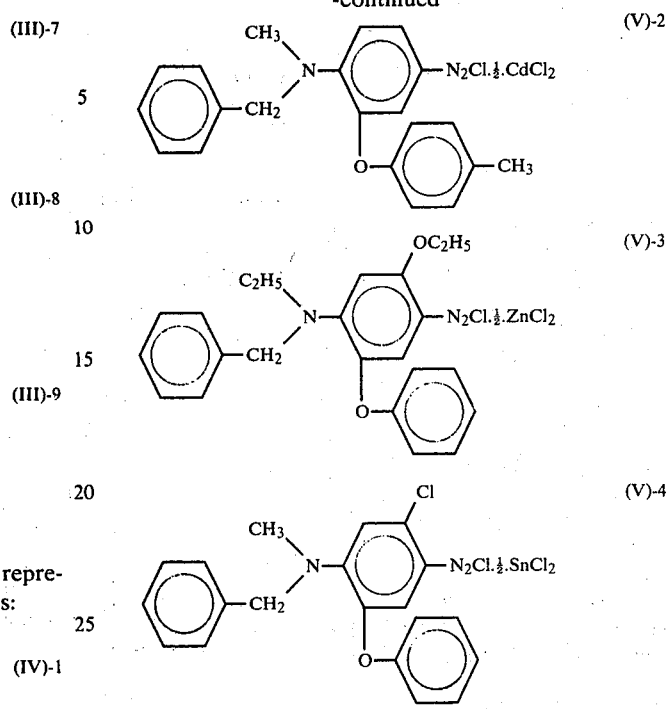

Couplers:

Examples of the couplers used in the present invention are as follows:

Phenol derivatives such as phenol, resorcinol, resorcylic acid, phloroglucinol, phloroglucinolcarboxylic acid, 2,6-dimethyl-1,3,5-trihydroxybenzene and 2,6-dihydroxy-3,5-dibromo-4-methoxy benzoic acid; and naphthol derivatives such as α-naphthol, β-naphthol, 2,3-dihydroxnaphthalene, 2,3-dihydroxynaphthalene-6-sodium sulfonate and 2-hydroxy-3-propylmorpholinonaphthoic acid.

In the present invention, a thermo-fusible material is contained in the thermosensitive recording layer in order to attain an instant coloring reaction upon heat application to the thermosensitive recording material. The thermo-fusible material promotes the fusing of the layer when heat is applied thereto, whereby the interaction of the diazo compound and the coupler in the thermosensitive recording layer is speedily effected and, accordingly, the coloring reaction can be initiated upon application of heat to the thermosensitive recording material.

It is peferable that the thermo-fusible material have a melting or softening point ranging from 50° C. to 250° C. A thermo-fusible material with a melting or softening point below 50° C. would cause poor long-term preservation in the thermosensitive recording material, while a thermo-fusible material having a melting or softening point above 250° C. will lead to insufficient thermal response to a thermal head for practical use.

Examples of the thermo-fusible materials for use in the present invention are as follows:

Alcohol derivatives such as 2-tribromethanol, 2,2-dimethyl-trimethylene glycol and cyclohexane-1,2-diol; acid derivatives such as malonic acid, glutaric acid, maleic acid, and methylmaleic acid; animal waxes such as bees wax and shellac wax; plant waxes such as carnauba wax; mineral waxes such as montan wax; petroleum waxes such as paraffin wax and microcrystalline wax; and other synthetic waxes such as polyalcohol esters of higher fatty acids, higher fatty ketones, higher fatty amines, higher fatty amides, condensates of fatty acids and amines, condensates of aromatic acids and amines, synthetic paraffins, paraffin chlorides, metal salts, etc.

The thermo-fusible material, in the present invention, may be added in an amount of 2 to 30 parts by weight, preferably 5 to 10 parts by weight to one part by weight of the diazo compound. These amounts are particularly suitable in the case of high speed printing in facsimile apparatus or the like. If the amount of the thermo-fusible material is less than 2 parts by weight, high coloring efficiency cannot be obtained, while higher amounts than 30 parts by weight may lead to blurred images.

Furthermore, in the present invention, a thermo-fusible or thermo-softening binder agent is employed for binding each component together in the thermosensitive layer and for stably supporting the thermosensitive layer on the support material.

With respect to the melting or softening point of the binder agent, the same concerns as in the case of the thermo-fusible material can be applied to the binder agent. That is, it is preferable that the binder agent have a melting or softening point ranging from 50° C. to 250° C. A binder agent with a melting or softening point below 50° C. would cause poor long-term perservation in the thermosensitive recording material, while a binder agent having a melting or softening point above 250° C. will lead to insufficient thermal response to the thermal head for practical use.

Examples of thermo-fusible or thermo-softening binder agents which can be used in the present invention include: cyclized rubber, polyvinyl acetate, polyvinyl chloride, co-polymer of vinyl chloride and vinyl acetate, acryl resins, polystyrene, polyesters, polybutadienes, acrylic acid ester and acrylic co-polymer of styrene and butadiene, and cellulose derivatives.

Such a binder agent is not necessarily used alone, but other binder agents may be added as a mixture (generally in the ratio of less than 30%, w/w) as long as they will not interfere with the object of the present invention, so as to provide stronger binding of each component in the layer to the support material.

Examples of the above-mentioned other binder agents are listed below.

Polyvinyl alcohol, polyacrylamide, casein, gelatin, starch and its derivatives, polyvinyl pyrrolidone, carboxymethyl cellulose, methyl cellulose, ethyl cellulose, chlorinated rubber, polystyrene (M.W. above 100,000), and water-soluble, organic solvent-soluble or water-dispersion-type resins such as urea-formaldehyde resins and phenol resins.

As described above, a thermosensitive recording material according to the present invention contains in its thermosensitive recording layer a diazo compound and a coupler as unconsecutive particles so that a coloring reaction does not occur during lengthy storage. Furthermore, the present recording material includes a thermo-fusible or thermo-softening binder agent and a thermo-fusible material in its thermosensitive recording layer so that the coloring reaction between the diazo compound and the coupler occurs with minimum energy usage.

According to the present invention, auxiliary components such as acidic materials, basic materials, binder agents, fillers and others may be added if necessary.

Acidic materials are for preventing a coupling reaction during storage and to give better preservation. The following are examples of acidic materials:

Tartaric acid, citric acid, boric acid, lactic acid, gluconic acid and sulfuric acid.

Basic materials are for promoting the coupling reaction upon heating. The following are examples of basic materials:

Caustic alkali and alkaline carbonates such as sodium hydroxide, calcium hydroxide and potassium carbonate. Materials which become basic when heated may also be used, examples of which include urea, thiourea and their derivatives, alkaline salts of trichloracetic acid, ammonium chloride, ammonium sulfate and ammonium citrate.

Fillers are added for improving the compatibility of the thermosensitive recording layer with the thermal head which applies heat to the layer for image formation. The following are examples of such fillers:

organic and inorganic materials such as microparticles of styrene resin, microparticles of urea-formaldehyde condensate resin, aluminum hydroxide, magnesium hydroxide, calcium carbonate, titanium, talc, kaolin, silica and aluminum.

The following auxiliary agents may also be used to hinder coloring during storage of the recording material: zinc chloride, zinc sulfate, sodium citrate, guanidine sulfate, calcium gluconate, sorbitol and saccharose.

Diazo-type thermosensitive recording materials according to the present invention can be obtained by the following procedure.

(1) Preparing a thermosensitive coloring layer by dispersing the above-mentioned diazo compound, coupler, thermo-fusible or thermo-softening binder agent, thermo-fusible material and other auxiliary components, if necessary, in a solvent which does not dissolve either the diazo compound or the coupler, so that the diazo compound and the coupler are dispersed in the form of unconsecutive particles. Examples of such solvents are water, toluene, methyl isobutylketone, methyl cellosolve, n-hexane or cyclohexane; and (2) applying the aforementioned dispersion to a support material such as paper, synthetic paper, plastic film or a metal-laminated support material, in an amount 1 g/m$^2$ to 10 g/m$^2$ and then drying the same.

The preferred embodiments of the present invention will be described further by the following Examples.

EXAMPLES 1 TO 5

|  | Parts by Weight |
|---|---|
| (1) Diazo dispersion |  |
| (Dispersion D-1) |  |
| [structure: morpholine-N-phenyl with OC$_2$H$_5$ groups and N$_2$PF$_6$] | 3 |
| Stearamide | 10 |
| Polyvinyl alcohol (10% aqueous solution) | 10 |
| Water | 27 |
| (Dispersion D-2) |  |

-continued

| | Parts by Weight |
|---|---|

[Chemical structure: CH$_3$—N(—CH$_2$—C$_6$H$_5$)—C$_6$H$_3$(OC$_2$H$_5$)(O—C$_6$H$_5$)—N$_2$BF$_4$]  3

| | |
|---|---|
| Polystyrene (MW ≈ 800, Softening Point ≈ 80° C.) | 6 |
| Benzene | 21 |

(Dispersion D-3)

[Chemical structure: (C$_2$H$_5$)$_2$N—C$_6$H$_4$—N$_2$Cl·½ZnCl$_2$]  3

| | |
|---|---|
| Calcium stearate | 5 |
| Citric acid | 5 |
| Polyester (MW ≈ 1000) | 10 |
| n-Hexane | 17 |

(2) Coupler Dispersions (Dispersion C-1)

| | |
|---|---|
| 2,6-Dihydroxy-3,5-dibromo-4-methoxybenzoic acid | 5 |
| Clay | 20 |
| Polyacrylamide (10% aqueous solution) | 10 |
| Water | 15 |

(Dispersion C-2)

| | |
|---|---|
| Phloroglucinolcarboxylic acid | 5 |
| Styrene resin filler | 20 |
| N—Octadecylcarbamoyl benzene | 15 |
| Polystyrene (MW ≈ 800, Softening Point ≈ 80° C.) | 15 |
| Tartaric acid | 5 |
| Benzene | 11 |

(Dispersion C-3)

| | |
|---|---|
| 2,3-Dihydroxynaphthalene-6-sodium sulfonate | 5 |
| N—Octadecyl(4-methoxycarbonyl)benzamide | 10 |
| Silica | 20 |
| Thiourea | 5 |
| Polyester (MW ≈ 1000) | 10 |
| n-Hexane | 10 |

(3) Mixed Dispersions (Dispersion M-1)

[Chemical structure: morpholino-substituted benzene with OC$_4$H$_9$ groups and N$_2$BF$_4$]  3

| | |
|---|---|
| Resorcinol-2-carboxylic acid | 5 |
| Stearamide | 20 |
| Citric acid | 5 |
| Sodium citrate | 5 |
| Polyester (MW ≈ 1000) | 20 |
| Clay | 20 |
| Cyclohexane | 22 |

(Dispersion M-2)

[Chemical structure: CH$_3$—C$_6$H$_4$—S—C$_6$H$_2$(OC$_2$H$_5$)$_2$—N$_2$Cl·½ZnCl$_2$]  3

| | |
|---|---|
| 2,6-Dihydroxy-3-chloro-4-methyl benzoic acid | 5 |
| N—Octadecyl-(4-methoxycarbonyl) benzamide | 30 |
| Silica | 20 |
| Urea | 5 |
| Polystyrene (MW ≈ 800, Softening Point ≈ 80° C.) | 20 |
| Ligroin | 17 |

The dispersions (D-1), (D-2), (D-3), (C-1), (C-2), (C-3), (M-1) and (M-2) described above were ground and dispersed in a ball mill for 24 hours in such combinations as are shown in the following table:

| | Coating liquids |
|---|---|
| Example 1 | Dispersion D-1 + Dispersion C-1 |
| Example 2 | Dispersion D-2 + Dispersion C-2 |
| Example 3 | Dispersion D-3 + Dispersion C-3 |
| Example 4 | Dispersion M-1 |
| Example 5 | Dispersion M-2 |
| Comparative Examples 1 | The solvent in Dispersion D-1 of Example 1 was replaced by acetone. |
| Comparative Examples 2 | The solvent in Dispersion D-2 of Example 2 was replaced by methyl isobutylketone. |
| Comparative Examples 3 | The solvent in Dispersion M-1 of Example 4 was replaced by water. |
| Comparative Examples 4 | N—Octadecyl (4-methoxycarbonyl) benzamide in Dispersion M-2 of Example 5 was omitted. |

Each of the coating liquids in Examples 1 to 5 and Comparative Examples 1 to 4 as described in the above table was applied to the surface of high quality paper (ca. 50 g/m$^2$) so as to form a thermosensitive layer with a deposition of 10 g/m$^2$ of the coating liquid. The thus prepared recording material was subjected to drying and calendering so as to have a smoothness of 500 seconds in terms of Beck's smoothness.

The thermosensitive recording materials thus obtained were employed in a commercially available facsimile apparatus (RIFAX 303 made by Ricoh Company, Ltd.), forming images in the G-II mode, and the images were then fixed by complete exposure to light using a commercially available diazo copying machine (RICOPY High-Start made by Ricoh Company, Ltd.).

Each image density obtained was determined by a Macbeth densitometer (RD-514).

Each background density was then measured by the Macbeth densitometer (RD-514) with respect to its initial background density and its subsequent background density. The initial background density was measured immediately after complete exposure of each diazo recording material to light, preceded by application of the coating liquid and drying the same. The subsequent background density was measured immediately after complete exposure of each diazo recording material preceded by application of the coating liquid and drying the same for 24 hours at 20° C. in the dark.

The preservability of each diazo recording material was also measured by measuring the background density after exposure to light, followed by keeping the material at 40° C. for 24 hours under relative humidity of 90%, as measured by a Macbeth densitometer (RD-514). A value below 0.20 is comparable to good preservation for more than 2 years at room temperature and room humidity in the dark.

The results are summarized in Table 1.

TABLE 1

| | Developed Color | Image Density | Background Density Initial Background Density | Background Density Subsequent Background Density | Preservability |
|---|---|---|---|---|---|
| Example | | | | | |
| 1 | Blue | 1.08 | 0.09 | 0.09 | 0.17 |
| 2 | Dark brown | 1.05 | 0.07 | 0.08 | 0.16 |
| 3 | Blue violet | 1.05 | 0.08 | 0.08 | 0.20 |
| 4 | Blue | 1.15 | 0.08 | 0.08 | 0.17 |
| 5 | Dark brown | 1.21 | 0.08 | 0.09 | 0.19 |
| Comparative Example | | | | | |
| 1 | Blue | 1.05 | 0.34 | 0.05 | 0.84 |
| 2 | Dark brown | 1.07 | 0.34 | 1.03 | 1.04 |
| 3 | Blue | 1.16 | 0.24 | 0.25 | 0.27 |
| 4 | Dark brown | 0.43 | 0.08 | 0.10 | 0.24 |

EXAMPLES 6 TO 9

| | Parts by Weight |
|---|---|
| (1) Diazo dispersions | |
| (Dispersion D-4) | |

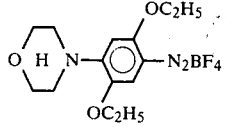

| | |
|---|---|
| | 3 |
| N—Octadecyl (4-methoxycarbonyl) benzamide | 6 |
| Silica | 6 |
| Cyclized rubber | 15 |
| n-Hexane | 20 |
| (Dispersion D-5) | |

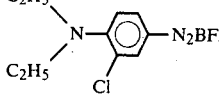

| | |
|---|---|
| | 3 |
| Behenamide | 10 |
| Polystyrene (MW ≈ 800, Softening Point ≈ 80° C.) | 10 |
| Benzene | 27 |
| (2) Coupler Dispersions | |
| (Dispersion C-4) | |
| Phloroglucinol | 5 |
| N—Octadecyl (4-methoxycarbonyl) benzamide | 5 |
| Cyclized rubber | 10 |
| n-Hexane | 30 |
| (Dispersion C-5) | |
| Phloroglucinol | 5 |
| Clay | 15 |
| Urea | 5 |
| Polystyrene (MW ≈ 800, Softening Point ≈ 80° C.) | 10 |
| Benzene | 15 |
| (3) Mixed Dispersions | |
| (Dispersion M-3) | |

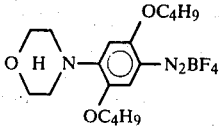

| | |
|---|---|
| | 3 |
| Phloroglucinol | 5 |
| Styrene resin filler | 10 |
| Citric acid | 5 |
| Stearamide | 10 |
| Polystyrene (MW = 800, Softening Point ≈ 80° C.) | 20 |
| Benzene | 47 |
| (Dispersion M-4) | |

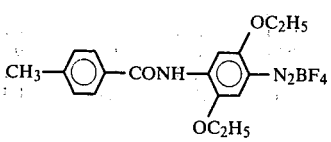

| | |
|---|---|
| | 3 |
| Phloroglucinol | 5 |
| Silica | 10 |
| Behenic acid | 6 |
| Magnesium stearate | 10 |
| Polyester (MW ≈ 1000) | 16 |
| Cyclohexane | 50 |

The dispersions (D-4), (D-5), (C-4), (C-5), (M-3) and (M-4) described above were ground and dispersed in a ball mill for 24 hours in such combinations as are shown in the following table:

| | | Coating liquid |
|---|---|---|
| Example | 6 | Dispersion D-4 + Dispersion C-4 |
| Example | 7 | Dispersion D-5 + Dispersion C-5 |
| Example | 8 | Dispersion M-3 |
| Example | 9 | Dispersion M-4 |
| Comparative Example | 5 | The solvent in dispersion D-4 of Example 6 was replaced by toluene, in which the diazo compound slightly dissolves. |
| Comparative Example | 6 | The diazo compound in Dispersion D-5 of Example 7 was replaced by a water-soluble salt complex of the diazo compound of a type containing a residue of Cl.½.ZnCl₂. |
| Comparative Example | 7 | The coupler in Dispersion M-3 of Example 8 was replaced by resorcinol. |
| Comparative Example | 8 | The diazo compound in Dispersion M-4 of Example 9 was replaced by a water-soluble salt complex of the diazo compound of a type containing a residue of Cl.½.SnCl₂. |

Each of the coating liquids in Examples 6 to 9 and Comparative Examples 5 to 8 as described in the above table was applied to the surface of high quality paper (ca. 50 g/m²) so as to form a thermosensitive coloring layer with a deposition of 10 g/m² of the coating liquid. The thus prepared recording material was subjected to drying and calendering so as to have a smoothness of 500 seconds in terms of Beck's smoothness.

The thermosensitive recording materials thus obtained were employed in a facsimile apparatus (RIFAX 3300 made by Ricoh Company, Ltd.), forming images in the G-III mode, and the images were then fixed by complete exposure to light using a commercially available diazo copying machine (RICOPY High-Start 205 made by Ricoh Company, Ltd.).

In exactly the same manner as in Examples 1 through 5 and Comparative Examples 1 through 4, the image density, the initial and subsequent background densities, and the preservability of each thermosensitive recording material were measured. The results are summarized in Table 2.

With respect to the preservability, a value below 0.20 indicates good preservation for more than 2 years at room temperature and room humidity in the dark.

TABLE 2

| | | | Background Density | | |
|---|---|---|---|---|---|
| | Developed Color | Image Density | Initial Background Density | Subsequent background Density | Preservability |
| Example | | | | | |
| 6 | Blue | 0.84 | 0.08 | 0.10 | 0.20 |
| 7 | Violet | 0.78 | 0.08 | 0.10 | 0.18 |
| 8 | Brown | 0.93 | 0.09 | 0.10 | 0.21 |
| 9 | Violet | 0.87 | 0.08 | 0.09 | 0.19 |
| Comparative Example | | | | | |
| 5 | Brown | 0.82 | 0.51 | 0.80 | 1.03 |
| 6 | Violet | 0.79 | 0.11 | 0.32 | 0.68 |
| 7 | Orange | 0.45 | 0.08 | 0.09 | 0.20 |
| 8 | Violet | 0.85 | 0.13 | 0.31 | 0.80 |

EXAMPLES 10 TO 14

| | | Parts by Weight |
|---|---|---|
| (1) | Diazo dispersion | |
| | (Dispersion D-6) | |

$$CH_3-\phi-S-\phi(OC_2H_5)_2-N_2Cl.\tfrac{1}{2}ZnCl_2 \quad 3$$

| Stearamide | 8 |
| n-Hexane | 39 |
| (Dispersion D-7) | |

$$CH_3-\phi-O-\phi(OC_4H_9)_2-N_2Cl.\tfrac{1}{2}SnCl_2 \quad 3$$

| Polystyrene | 9 |
| (MW ≈ 800, Softening Point ≈ 80° C.) | |
| Benzene | 38 |
| (Dispersion D-8) | |

$$\text{(CH}_3\text{)(PhCH}_2\text{)N}-\phi(OCH_3)-O-\phi-CH_3-N_2Cl.\tfrac{1}{2}ZnCl_2 \quad 3$$

| Calcium stearate | 6 |
| Tartaric acid | 3 |
| Polyester (MW ≈ 1000) | 12 |
| Petroleum ether | 26 |
| (2) Coupler Dispersion | |
| (Dispersion C-6) | |
| Phloroglucinol | 5 |
| Clay | 15 |
| Cyclized rubber | 10 |
| n-Hexane | 20 |
| (Dispersion C-7) | |
| Phloroglucinol | 5 |
| Silica | 10 |
| N—Octadecyl(4-methoxycarbonyl)benzamide | 10 |
| Polystyrene | 10 |
| (MW ≈ 800, Softening Point ≈ 80° C.) | |
| Benzene | 15 |
| (Dispersion C-8) | |
| Phloroglucinol | 5 |
| Urea | 10 |
| Polyester (MW ≈ 1000) | 10 |
| Petroleum ether | 25 |
| (3) Mixed Dispersions | |
| (Dispersion M-5) | |

$$CH_3-\phi-S-\phi(OCH_3)_2-N_2Cl.\tfrac{1}{2}SnCl_2 \quad 3$$

| Behenamide | 10 |
| Sodium citrate | 10 |
| Clay | 5 |
| Phloroglucinol | 5 |
| Cyclized rubber | 10 |
| Ligroin | 57 |
| (Dispersion M-6) | |

$$(C_2H_5)(PhCH_2)N-\phi(Cl)(O-\phi)-N_2Cl.\tfrac{1}{2}ZnCl_2 \quad 3$$

| Phloroglucinol | 5 |
| Silica | 10 |
| Diphenylguanidine | 6 |
| Citric acid | 6 |
| Polystyrene | 15 |
| (MW ≈ 800, Softening Point ≈ 80° C.) | |
| Benzene | 55 |

The dispersions (D-6), (D-7), (D-8), (C-6), (C-7), (C-8), (M-5) and (M-6) described above were ground and dispersed in a ball mill for 24 hours in such combinations as are shown in the following table:

| | Coating liquid |
|---|---|
| Example 10 | Dispersion D-6 + Dispersion C-6 |
| Example 11 | Dispersion D-7 + Dispersion C-7 |
| Example 12 | Dispersion D-8 + Dispersion C-8 |
| Example 13 | Dispersion M-5 |
| Example 14 | Dispersion M-6 |
| Comparative Examples 9 | The solvent in dispersion D-6 of Example 10 was replaced by toluene, in which the diazo compound slightly dissolves. |
| Comparative Examples 10 | Phloroglucinol in Dispersion C-7 of Example 11 was replaced by resorcinol-2-carboxylic acid. |
| Comparative Examples 11 | The diazo compound in Dispersion D-8 of Example 12 was replaced by the following: |

$$(CH_3)(PhCH_2)N-\phi-N_2Cl.\tfrac{1}{2}ZnCl_2$$

Each of the coating liquids in Examples 10 through 14 and Comparative Examples 9 through 11 as described in the above table was applied to the surface of high quality paper (ca. 50 g/m$^2$) so as to form a thermosensitive coloring layer with a deposition of 10 g/m$^2$ of the coating liquid. The thus prepared recording material was subjected to drying and calendering so as to have a smoothness of 500 seconds in terms of Beck's smoothness.

The thermosensitive recording materials thus obtained were employed in a facsimile apparatus (RIFAX 3300 made by Ricoh Company, Ltd.), forming images in the G-III mode, and the images were then fixed by complete exposure to light using a commercially available diazo copying machine (RICOPY High-Start 205 made by Ricoh Company, Ltd.).

In exactly the same manner as in Examples 1 through 5 and Comparative Examples 1 through 4, the image density, the initial and subsequent background densities, and the preservability of each thermosensitive recording material were measured. The results are summarized in Table 3.

With respect to the preservability, a value below 0.20 indicates good preservation for more than 2 years at room temperature and room humidity in the dark.

TABLE 3

|  | Developed Color | Image Density | Initial background Density | Subsequent background Density | Preservability |
|---|---|---|---|---|---|
| Example |  |  |  |  |  |
| 10 | Black | 1.05 | 0.08 | 0.08 | 0.20 |
| 11 | Black | 1.03 | 0.07 | 0.08 | 0.16 |
| 12 | Black | 0.98 | 0.07 | 0.07 | 0.17 |
| 13 | Black | 1.04 | 0.08 | 0.09 | 0.18 |
| 14 | Black | 0.96 | 0.07 | 0.07 | 0.16 |
| Comparative Example |  |  |  |  |  |
| 9 | Black | 0.98 | 0.80 | 0.92 | 1.19 |
| 10 | Brown | 0.35 | 0.07 | 0.08 | 0.15 |
| 11 | Violet | 0.61 | 0.08 | 0.08 | 0.18 |

What is claimed is:

1. A diazotype thermosensitive recording material, comprising: a support material and a thermosensitive recording layer formed thereon, said thermosensitive recording layer comprising (a) a diazonium compound selected from the group consisting of diazonium compounds having the formulas (IV) and (V):

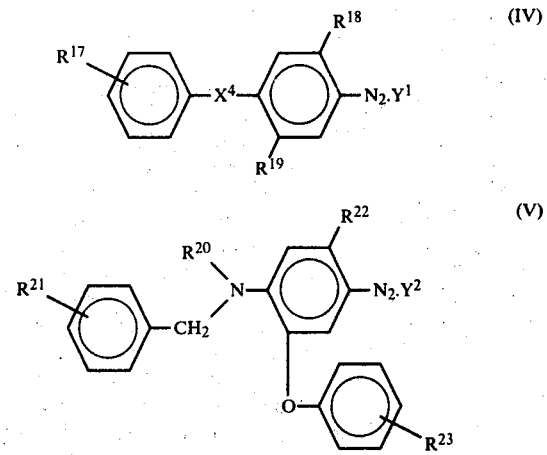

wherein $R^{17}$, $R^{18}$, $R^{19}$, $R^{21}$, $R^{22}$ and $R^{23}$ each is hydrogen, lower alkyl, lower alkoxy or halogen, $R^{20}$ is hydrogen, lower alkyl or lower alkoxy; $R^4$ is sulfur or oxygen; and $Y^1$ and $Y^2$ each represent a halogen ion, a fluorine-containing ion, or an acidic residue forming a double salt, in combination with a metallic salt, (b) a coupler consisting essentially of phloroglucinol, (c) a thermo-fusible or thermo-softening, film-forming binder and (d) a thermo-fusible material capable of promoting fusing said layer when heat is applied thereto to effect a speedy coloring reaction between said diazonium compound and said coupler, the weight ratio of said diazonium compound to said thermo-fusible material being in the range of 1:2 to 1:30, said thermosensitive recording layer has been formed by drying on said support, a dispersion comprising said diazonium compound, said coupler, said thermo-fusible or thermo-softening binder, said thermo-fusible material, and a solvent in which said diazo compound and said coupler are substantially insoluble, so that both said diazonium compound and said coupler exist as unconsecutive particles in said thermosensitive recording layer.

2. A recording material as claimed in claim 1, wherein $Y^1$ and $Y^2$ are each a salt complex comprising a halogen and a member selected from the group consisting of $ZnCl_2$, $CdCl_2$ and $SnCl_2$.

3. A recording material as claimed in claim 1, wherein $Y^1$ and $Y^2$ are each a member selected from the group consisting of $BF_4^-$ and $PF_6^-$.

4. A recording material as claimed in claim 1, wherein said diazonium compound is selected from the group consisting of:

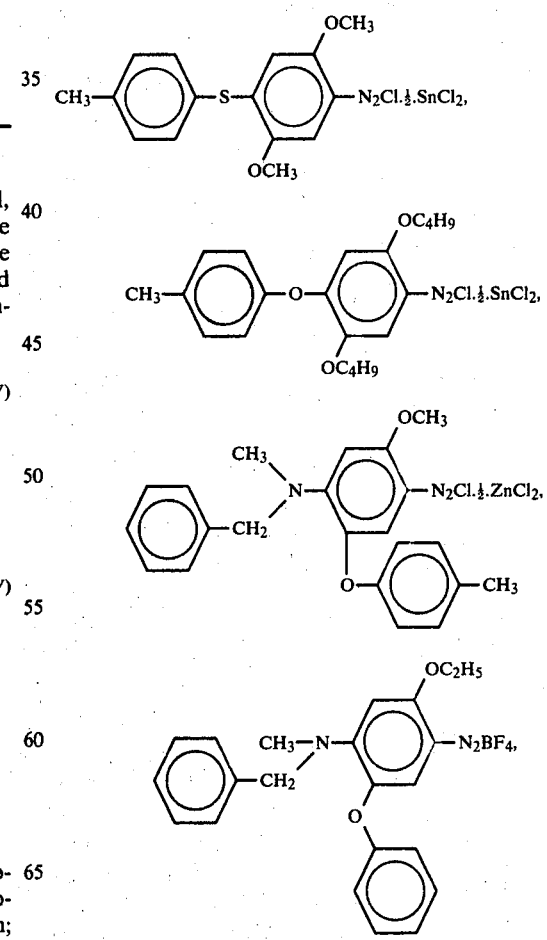

-continued

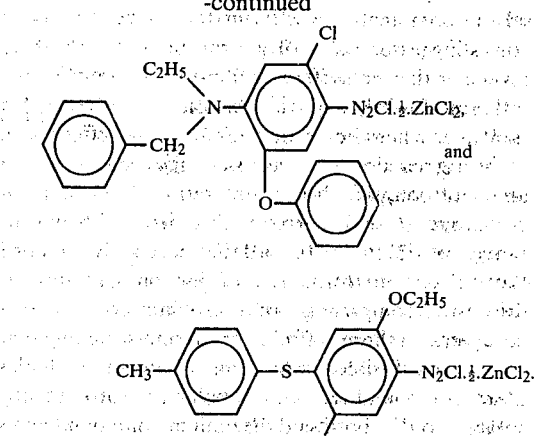

5. A recording material as claimed in claim 1, wherein said diazonium compound is:

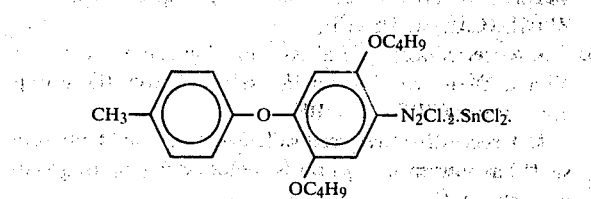

6. A recording material as claimed in claim 1, wherein said thermo-fusible or thermo-softening binder and said thermo-fusible material each have a melting or softening point in the range of from 50° C. to 250° C.

7. A recording material as claimed in claim 6, wherein said thermo-fusible material is a member selected from the group consisting of 2-tribromethanol, 2,2-dimethyl-trimethylene glycol, cyclohexane-1,2-diol, malonic acid, glutaric acid, maleic acid, methylmaleic acid, bees wax, shellac wax, carnauba wax, montan wax, paraffin wax, microcrystalline wax, polyalcohol esters of higher fatty acids, higher fatty ketones, higher fatty amines, higher fatty amides, condensates of fatty acids and amines, condensates of aromatic acids and amines, synthetic paraffins, paraffin chlorides and metal salts.

8. A recording material as claimed in claim 6, wherein said thermo-fusible or thermo-softening binder is a member selected from the group consisting of cyclized rubber, polyvinyl acetate, polyvinyl chloride, copolymer of vinyl chloride and vinyl acetate, acrylic resins, polystyrene, polyesters, polybutadienes, acrylic acid esters and acrylic co-polymers of styrene and butadiene, and cellulose derivatives.

9. A diazotype thermosensitive recording material comprising a support material and a thermosensitive recording layer formed thereon, said thermosensitive recording layer comprising (a) a diazonium compound selected from the group consisting of diazonium compounds having the formula:

wherein $R^{21}$, $R^{22}$ and $R^{23}$ each is hydrogen, lower alkyl, lower alkoxy or halogen; $R^{20}$ is hydrogen, lower alkyl or lower alkoxy and $Y^2$ represents a halogen ion, a fluorine-containing ion, or an acidic residue forming a double salt, in combination with a metallic salt; (b) a coupler, (c) a thermo-fusible or thermo-softening, film-forming binder and (d) a thermo-fusible material capable of promoting fusing said layer when heat is applied thereto to effect a speedy coloring reaction between said diazonium compound and said coupler, the weight ratio of said diazonium compound to said thermo-fusible material being in the range of 1:2 to 1:30, said thermosensitive recording layer has been formed by drying on said support a dispersion comprising said diazonium compound, said coupler, said thermo-fusible or thermo-softening binder, said thermo-fusible material, and a solvent in which said diazo compound and said coupler are substantially insoluble, so that both said diazonium compound and said coupler exist as unconsecutive particles in said thermosensitive recording layer.

10. A recording material as claimed in claim 9, wherein $Y^2$ is a salt complex comprising a halogen and a member selected from the group consisting of $ZnCl_2$, $CdCl_2$ and $SnCl_2$.

11. A recording material as claimed in claim 9, wherein $Y^2$ is selected from the group consisting of $BF_4^-$ and $PF_6^-$.

12. A recording material as claimed in claim 9, wherein said coupler is a member selected from the group consisting of phenol, resorcinol, resorcylic acid, phloroglucinol, phloroglucinolcarboxylic acid, 2,6-dimethyl-1,3,5-trihydroxybenzene, 2,6-dihydroxy-3,5-dibromo-4-methoxy benzoic acid, α-naphthol, β-naphthol, 2,3-dihydroxynaphthalene, 2,3-dihydroxynaphthalene-6-sodium sulfonate and 2-hydroxy-3-propylmorpholino-naphthoic acid.

13. A recording material as claimed in claim 9, wherein said thermo-fusible or thermo-softening binder and said thermo-fusible material each have a melting or softening point in the range of from 50° C. to 250° C.

14. A recording material as claimed in claim 13, wherein said thermo-fusible material is a member selected from the group consisting of 2-tribromethanol, 2,2-dimethyltrimethylene glycol, cyclohexane-1,2-diol, malonic acid, glutaric acid, maleic acid, methylmaleic acid, bees wax, shellac wax, carnauba wax, montan wax, paraffin wax, microcrystalline wax, polyalcohol esters of higher fatty acids, higher fatty ketones, higher fatty amines, higher fatty amides, condensates of fatty acids and amines, condensates of aromatic acids and amines, synthetic paraffins, paraffin chlorides and metal salts.

15. A recording material as claimed in claim 13, wherein said thermo-fusible or thermo-softening binder agent is a member selected from the group consisting of cyclized rubber, polyvinyl acetate, polyvinyl chloride, co-polymer of vinyl chloride and vinyl acetate, acryl resins, polystyrene, polyesters, polybutadienes, acrylic acid esters and acrylic co-polymers of styrene and butadiene, and cellulose derivatives.

16. A recording material as claimed in claim 13, in which said coupler is phloroglucinol.

17. A recording material as claimed in claim 9, wherein said diazonium compound is selected from the group consisting of:

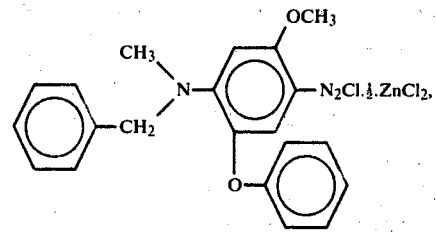

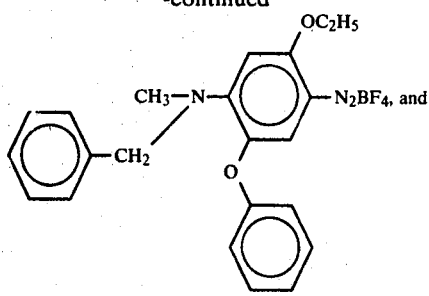

18. A recording material as claimed in claim 9, wherein said diazonium compound is:

* * * * *

UNITED STATES PATENT AND TRADEMARK OFFICE
CERTIFICATE OF CORRECTION

PATENT NO. : 4 411 979

DATED : October 25, 1983

INVENTOR(S) : Masanaka NAGAMOTO et al

It is certified that error appears in the above-identified patent and that said Letters Patent is hereby corrected as shown below:

On the title page at item [75] change the name of the second inventor to ---Yosihiro Koseki---.

Column 17, line 67; change "$R^4$" to ---$X^4$---.

Column 21, lines 25-35; change the formula to read as follows:

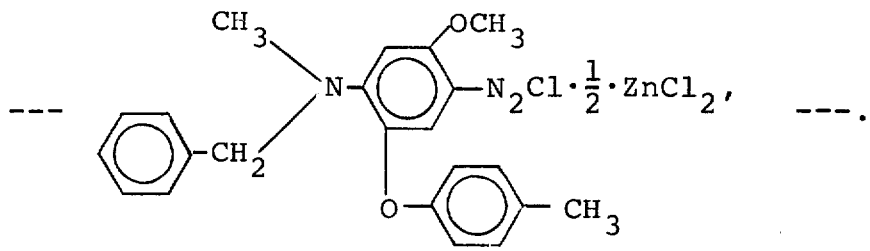

Signed and Sealed this

Twenty-seventh Day of March 1984

[SEAL]

Attest:

GERALD J. MOSSINGHOFF

Attesting Officer      Commissioner of Patents and Trademarks